US011650573B2

(12) United States Patent
Mai et al.

(10) Patent No.: US 11,650,573 B2
(45) Date of Patent: May 16, 2023

(54) MANAGEMENT METHOD FOR CUTTING TOOL OF MACHINE TOOL

(71) Applicant: INDUSTRIAL TECHNOLOGY RESEARCH INSTITUTE, Hsinchu (TW)

(72) Inventors: Chao-Chuang Mai, Taichung (TW); Chin-Hui Chen, Taichung (TW); Chi-Hsiang Lin, Changhua County (TW); Zi-Chiao Lin, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 505 days.

(21) Appl. No.: 16/826,905

(22) Filed: Mar. 23, 2020

(65) Prior Publication Data

US 2021/0240164 A1    Aug. 5, 2021

(30) Foreign Application Priority Data

Jan. 31, 2020 (TW) ................................ 109103053

(51) Int. Cl.
*G05B 19/4155* (2006.01)
(52) U.S. Cl.
CPC ............... *G05B 19/4155* (2013.01); *G05B 2219/35229* (2013.01); *G05B 2219/45044* (2013.01)
(58) Field of Classification Search
None
See application file for complete search history.

(56) References Cited

U.S. PATENT DOCUMENTS

| 5,244,447 | A | 9/1993 | Tanaka et al. |
| 5,798,928 | A | 8/1998 | Niwa |
| 8,316,742 | B2 | 11/2012 | Craig et al. |
| 9,292,811 | B2 | 3/2016 | O'Brien et al. |

(Continued)

FOREIGN PATENT DOCUMENTS

| CN | 101134296 A | 3/2008 |
| CN | 102024164 A | 4/2011 |

(Continued)

OTHER PUBLICATIONS

Chinese Office Action dated Dec. 31, 2021 as received in application No. 202010107673.2.

(Continued)

*Primary Examiner* — Sean Shechtman
(74) *Attorney, Agent, or Firm* — Maschoff Brennan

(57) ABSTRACT

A management method for a cutting tool of a machine tool is provided. A user host imports a graphical data of a workpiece and a cutting tool database into CAM, and a user may select cutting tools to establish a complete machining process. T codes are replaced with electronic tags. Before executing a machine code comprising the electronic tags, the machine tool re-scans the cutting tools assembled at a tool turret and updates cutting tool arrangement information to ensure that the tool turret is equipped with the cutting tools used in the machining process. When the machine tool stores the electronic tags, a ready message is displayed for reminding an operator. When the electronic tags are not stored, the current storage location of a cutting tool lacked in the machining process or a warning message is displayed at the operation interface for reminding the operator.

3 Claims, 8 Drawing Sheets

(56) References Cited

U.S. PATENT DOCUMENTS

| | | |
|---|---|---|
| 10,209,702 B2 | 2/2019 | Cheng et al. |
| 2004/0267508 A1 | 12/2004 | Huang et al. |
| 2008/0051927 A1 | 2/2008 | Prestidge et al. |
| 2010/0204818 A1 | 8/2010 | Yamada et al. |
| 2012/0072009 A1 | 3/2012 | Neumaier et al. |
| 2016/0259317 A1 | 9/2016 | Peters |
| 2017/0343983 A1 | 11/2017 | Yu et al. |

FOREIGN PATENT DOCUMENTS

| | | |
|---|---|---|
| CN | 102799142 A | 11/2012 |
| CN | 103076764 A | 5/2013 |
| CN | 103559578 A | 2/2014 |
| CN | 105700478 A | 6/2016 |
| CN | 108393724 A | 8/2018 |
| CN | 108655796 A | 10/2018 |
| CN | 208773108 U | 4/2019 |
| CN | 109917770 A | 6/2019 |
| CN | 209036072 U | 6/2019 |
| TW | 200846124 A | 12/2008 |
| TW | I309187 B | 5/2009 |
| TW | I488709 B | 6/2015 |
| TW | I610738 B | 1/2018 |
| TW | M575547 U | 3/2019 |

OTHER PUBLICATIONS

Taiwan Office Action dated Sep. 7, 2021 as received in application No. 109103053.

Liang-Wei, Yu, "How does RFID-based intelligent machine tool cutter be managed" Dec. 24, 2019.

TW Office Action in Application No. 109103053 dated Mar. 10, 2021.

MANAGEMENT METHOD FOR CUTTING TOOL OF MACHINE TOOL

CROSS-REFERENCE TO RELATED APPLICATIONS

This non-provisional application claims priority under 35 U.S.C. § 119(a) on Patent Application No(s). 109103053 filed in Republic of China on Jan. 31, 2020, the entire contents of which are hereby incorporated by reference.

BACKGROUND

1. Technical Field

This disclosure relates to a method for managing cutting tools, especially for a method for managing cutting tools of a machine tool.

2. Related Art

With a rapid development of machining technology, a use of computer numerical control is becoming more and more popular. Because complexity of a process is greatly increased, a frequency of loading and unloading for various types of cutting tools becomes higher and higher between a warehouse and a tool machine, which makes a management of cutting tools is increasingly difficult. However, whether a factory has a good and comprehensive tool management method is not only closely related to an efficiency of a production line, but also affects a machining quality and a machining cost.

In addition, a good and comprehensive tool management method can be regarded as a safety protection for factory operators. For example, the tool management method can avoid interferences or accidents caused by a wrong installation of cutting tools or wrong machine codes. Furthermore, current machine tools located in the factory are independent respectively and lack the function of interactively transmitting processing information. Therefore, an operator takes much time to find required cutting tools from multiple machine tools and the warehouse every time.

Therefore, there is indeed a need for a cutting tool management method with better efficiency, which can at least improve the above disadvantages.

SUMMARY

According to one or more embodiment of this disclosure, a management method for a cutting tool of a machine tool comprises: via a user host, importing a graphical data of a workpiece and a cutting tool database into a computer-aided manufacturing program of the user host; via the user host, executing a machine code generating process to generate a machine code, wherein the machine code comprises an electronic tag of a cutting tool required in a machining process of the workpiece; via a processor of the machine tool, reading the machine code to determine whether a storing unit of the machine tool stores the electronic tag of the cutting tool required in the machining process; via the processor of the machine tool, outputting a ready message to an operation interface of the machine tool when the processor of the machine tool determines that the storing unit of the machine tool stores the electronic tag of the cutting tool required in the machining process; and via the processor of the machine tool, executing a cutting tool searching process to output a current storage location of the cutting tool required in the machining process or a warning message to the operation interface of the machine tool when the processor of the machine tool determines that the storing unit of the machine tool does not store the electronic tag of the cutting tool required in the machining process.

BRIEF DESCRIPTION OF THE DRAWINGS

The present disclosure will become more fully understood from the detailed description given herein below and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
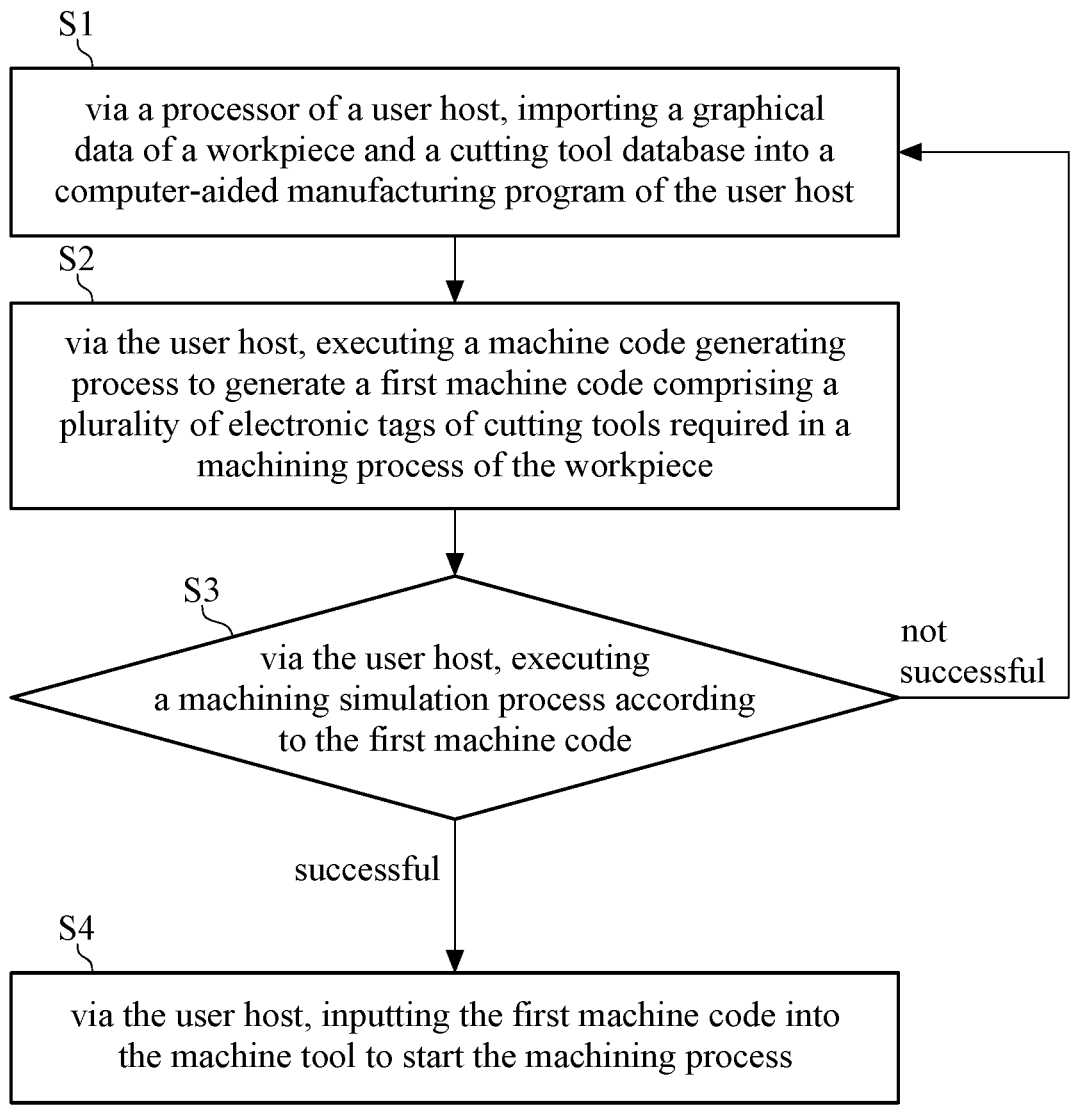
FIG. 1 is a flowchart of a management method for a cutting tool of a machine tool according to a first embodiment of the present disclosure.

FIG. 1 is a flowchart of a management method for a cutting tool of a machine tool according to a first embodiment of the present disclosure. As shown in FIG. 1, a step S1 is, via a processor of a user host, importing a graphical data of a workpiece and a cutting tool database into a computer-aided manufacturing (CAM) program of the user host. A step S2 is, via the user host, executing a machine code generating process to generate a first machine code comprising a plurality of electronic tags of cutting tools required in a machining process of the workpiece. The number of the electronic tag is not limited, in other embodiment, the first machine code may comprise an electronic tag. Through the steps S1 and S2, the required cutting tools may be selected from a cutting tool database, and T codes are replaced with the plurality of electronic tags. In this way, the electronic tags of the required cutting tools are recorded in the NC code rather than the location. A step S3 is, via the user host, executing a machining simulation process according to the first machine code. When the result of the step S3 is successful, an interference between the cutting tools and the components or an over-travel of any one of the cutting tools does not happen when the workpiece is actually machined by the machine tool according to the first machine code, then step S4 is performed. When the result of the step S3 is not successful (means an interference or an over-travel happens), then the step S1 is performed again to check whether the imported graphical data of the workpiece and the selected cutting tools are wrong or the step S2 is performed again to check whether the first machine code is wrong. The step S4 is, via the user host, inputting the first machine code into the machine tool to start the machining process.

Figure 2:
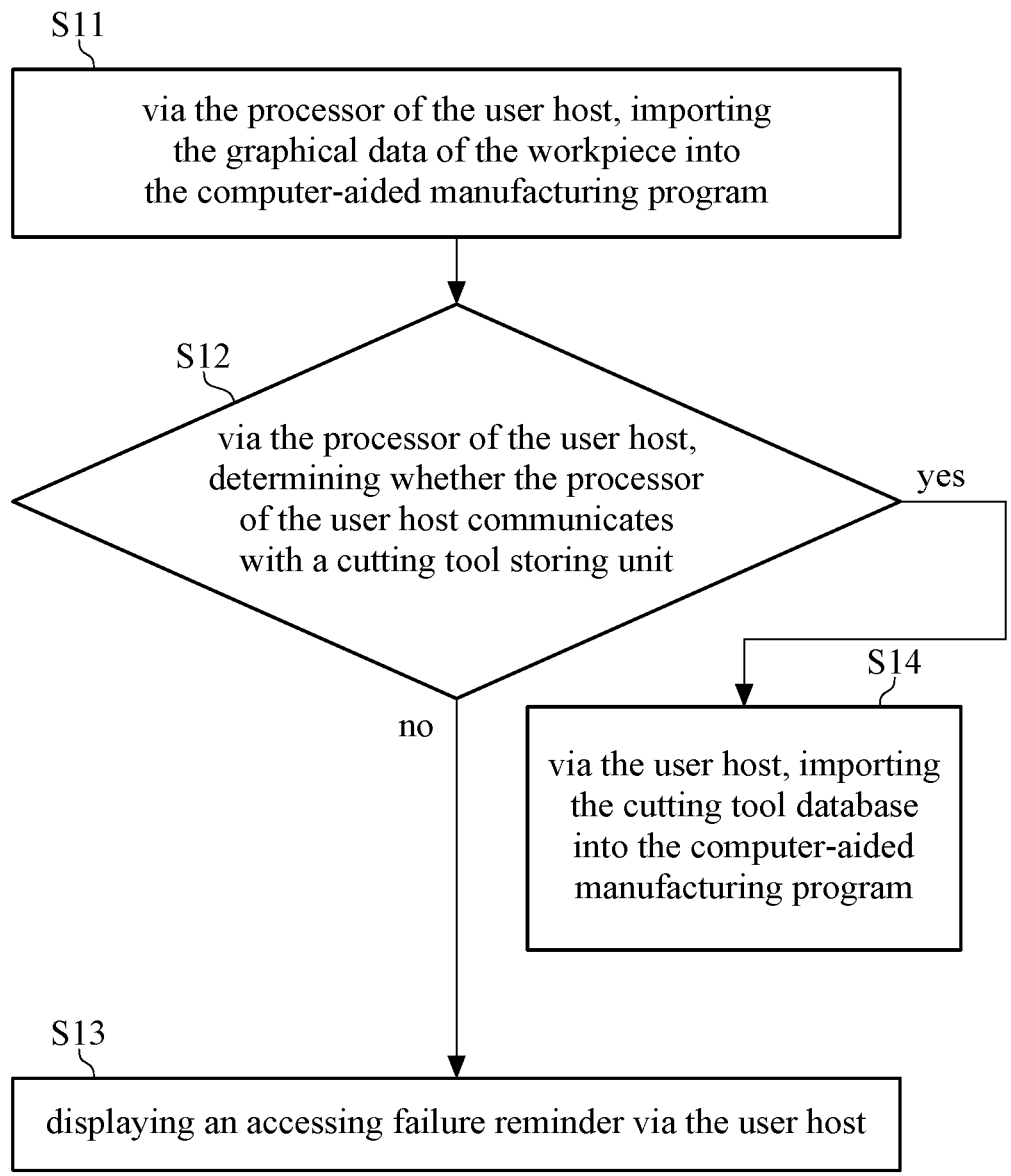
FIG. 2 shows sub-steps of a step S1 of FIG. 1.

FIG. 2 shows sub-steps of a step S1 of FIG. 1. As shown in FIG. 2, a step S11 is, via the processor of the user host, importing the graphical data of the workpiece into the computer-aided manufacturing program. A step S12 is, via the processor of the user host, determining whether the processor of the user host communicates with a cutting tool storing unit, wherein a cutting tool database storing unit stores the plurality of electronic tags corresponding to the cutting tools which are equipped on the tool turret. Each of the electronic tags, such as a radio frequency identification, corresponds to a unique cutting tool. Moreover, the cutting tool database further comprises size information, current storage locations, and estimation of rest life of the cutting tools. These machining-related data are linked to the electronic tags, so they may be obtained from the cutting tool database by reading the electronic tags. When the user host determines that the user host does not communicate with the cutting tool database storing unit, then a step S13 is performed. When the user host determines that the user host communicates with the cutting tool database storing unit, then a step S14 is performed.

The step S13 is displaying an accessing failure reminder via the user host, thereby reminding an operator of the user host. The step S14 is, via the user host, importing the cutting tool database into the computer-aided manufacturing (CAM) program, then the step S2 is performed.

Figure 3:
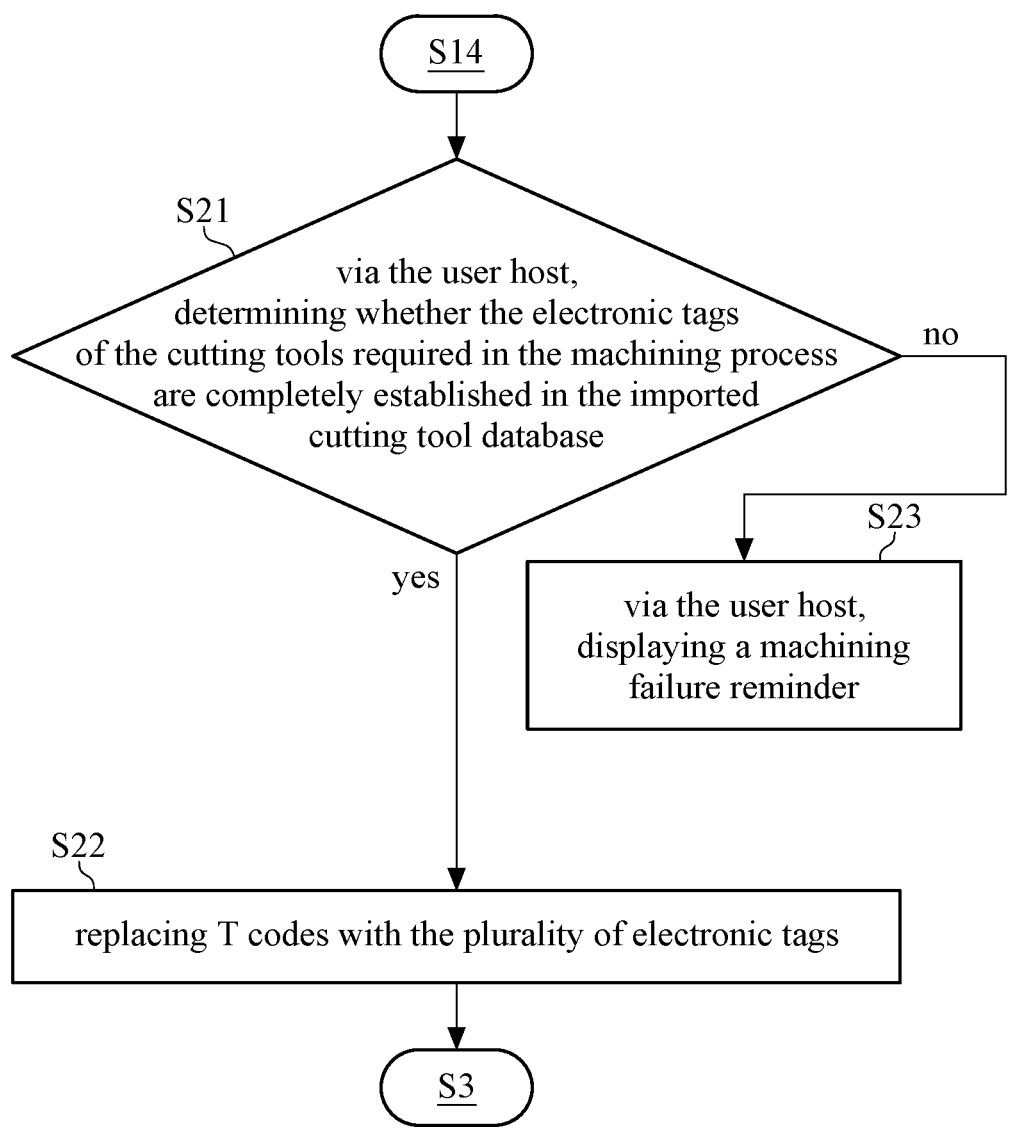
FIG. 3 shows sub-steps of a step S2 of FIG. 1.

FIG. 3 shows sub-steps of a step S2 of FIG. 1. As shown in FIG. 3, a step S21 is, via the user host, determining whether the electronic tags of the cutting tools required in the machining process are completely established in the imported cutting tool database. When the user host determines that the electronic tags of the cutting tools required in the machining process are completely established in the imported cutting tool database, which means that all of the cutting tools required in the machining process have corresponding electronic tags established in the cutting tool database, then a step S22 is performed. When the user host determines that the electronic tags of the cutting tools required in the machining process are not completely established in the imported cutting tool database, which means that at least one of the cutting tools required in the machining process does not have corresponding electronic tag, then a step S23 is performed. The step S22 is replacing locations of the required cutting tools (T codes) with the plurality of electronic tags, thereby generating the first machine code comprising the plurality of electronic tags, then the step S3 is performed. A step S23 is, via the user host, displaying a machining failure reminder, thereby reminding an operator of the user host.

Figure 4:
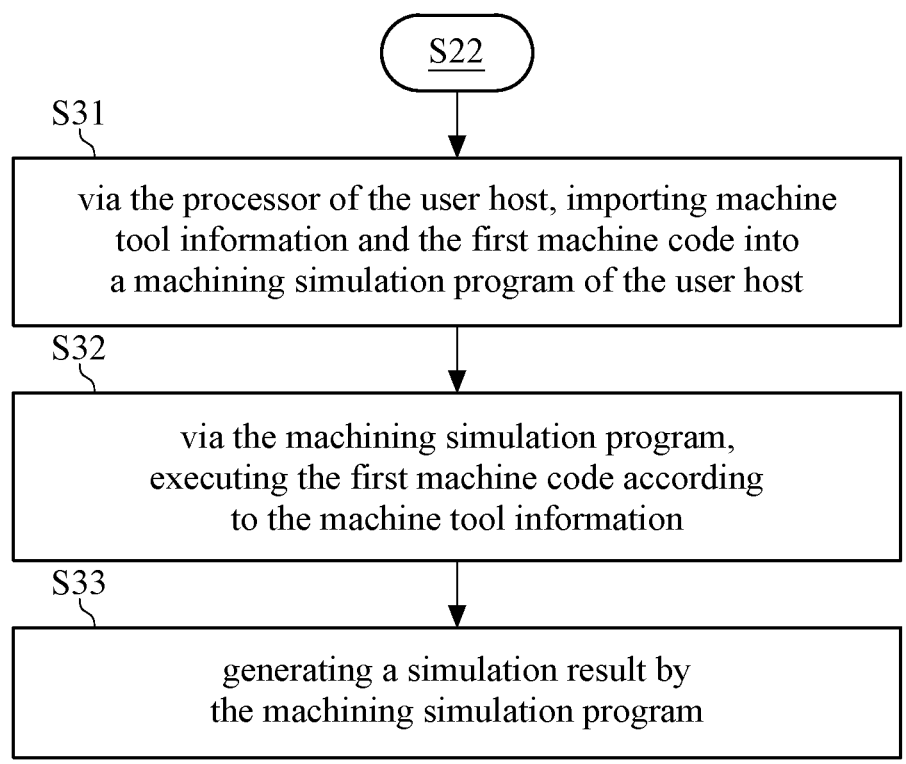
FIG. 4 shows steps of a machining simulation process of FIG. 1.

FIG. 4 shows steps of a machining simulation process of FIG. 1. As shown in FIG. 4, a step S31 is, via the processor of the user host, importing machine tool information and the first machine code described in the step S2 into a machining simulation program of the user host. The machine tool information may comprise a machining region of the machine tool and the number of the cutting tools which the machine tool can be equipped with. A step S32 is, via the machining simulation program, executing the first machine code with the size information of the cutting tools obtained from the cutting tool database according to the electronic tags of the first machine code. A step S33 is generating a simulation result by the machining simulation program. Through the simulation result, the operator of the user host may evaluate in advance whether an interference between the cutting tools and the components or an over-travel of any one of the cutting tools happens when the workpiece is actually machined according to the first machine code.

Figure 5:
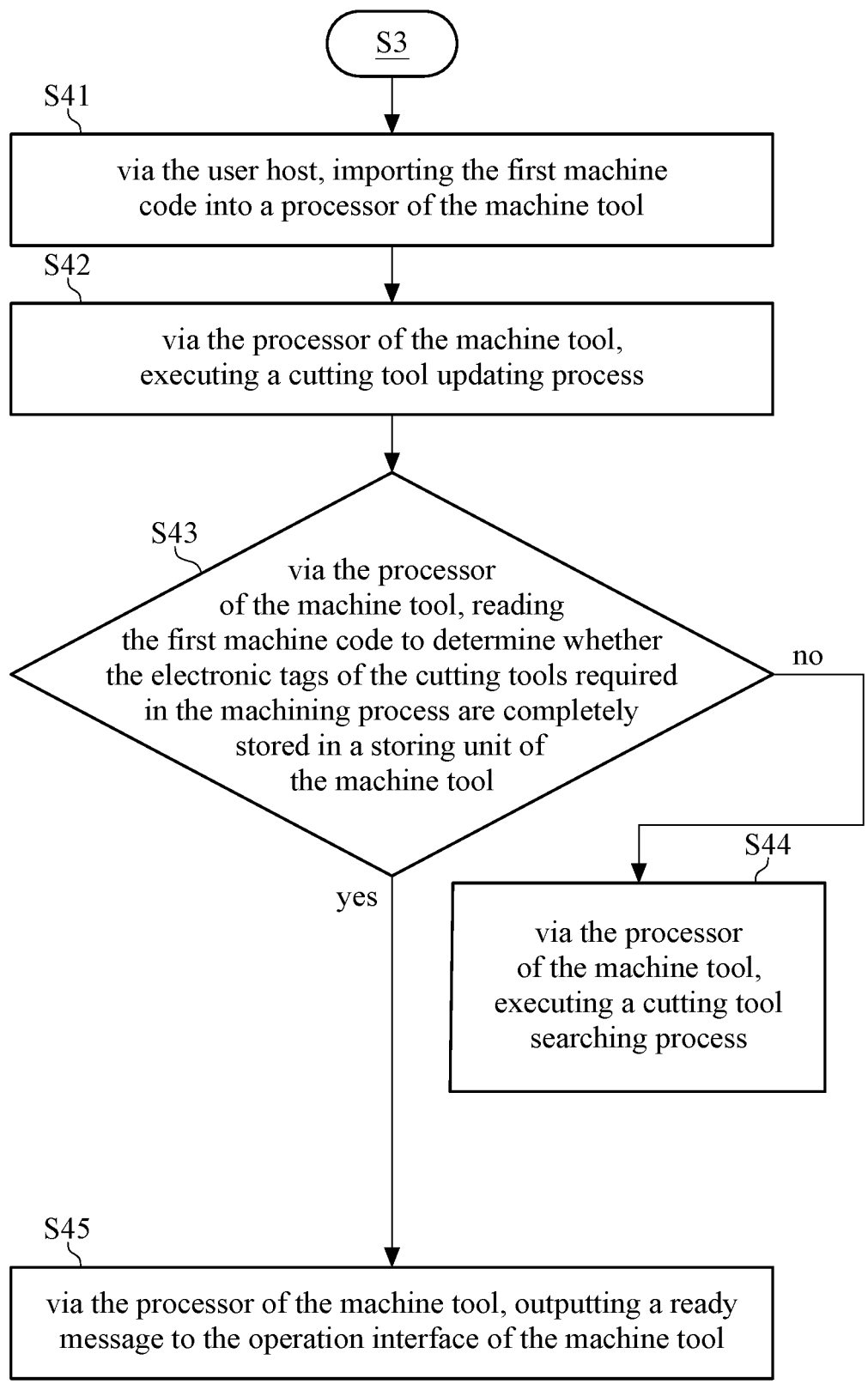
FIG. 5 shows steps of a machine tool operating process of FIG. 1.

FIG. 5 shows steps of a machine tool operating process of FIG. 1. As shown in FIG. 5, A step S41 is, via the user host, importing the first machine code described in the step S2 into a processor of the machine tool. A step S42 is, via the processor of the machine tool, executing a cutting tool updating process to ensure that position data of the cutting tools recorded in the cutting tool database are respectively consistent with current positions of the cutting tools. A step S43 is, via the processor of the machine tool, reading the first machine code to determine whether the electronic tags of the cutting tools required in the machining process are completely stored in a storing unit of the machine tool. When the processor of the machine tool determines that the electronic tags of the cutting tools required in the machining process are completely stored in the storing unit of the machine tool, then a step S44 is performed. When the processor of the machine tool determines that the electronic tags of the cutting tools required in the machining process are not completely stored in the storing unit of the machine tool, then a step S45 is performed.

The step S44 is, via the processor of the machine tool, executing a cutting tool searching process to display a current storage location of a lacked cutting tool required in the machining process or warning message at an operation interface of the machine tool.

The step S45 is, via the processor of the machine tool, outputting a ready message to the operation interface of the machine tool, and displaying the ready message at the operation interface of the machine tool, thereby reminding an operator of the machine tool.

That is worth mentioning. The machine tool updates the estimation of rest life recorded in the cutting tool database after the machine tool finishes the process every time. In this way, via reading the electronic tags of the first machine code, the rest life of the cutting tools may be obtained from the cutting tool database to evaluate whether any one of the cutting tools needs to be replaced.

Figure 6:
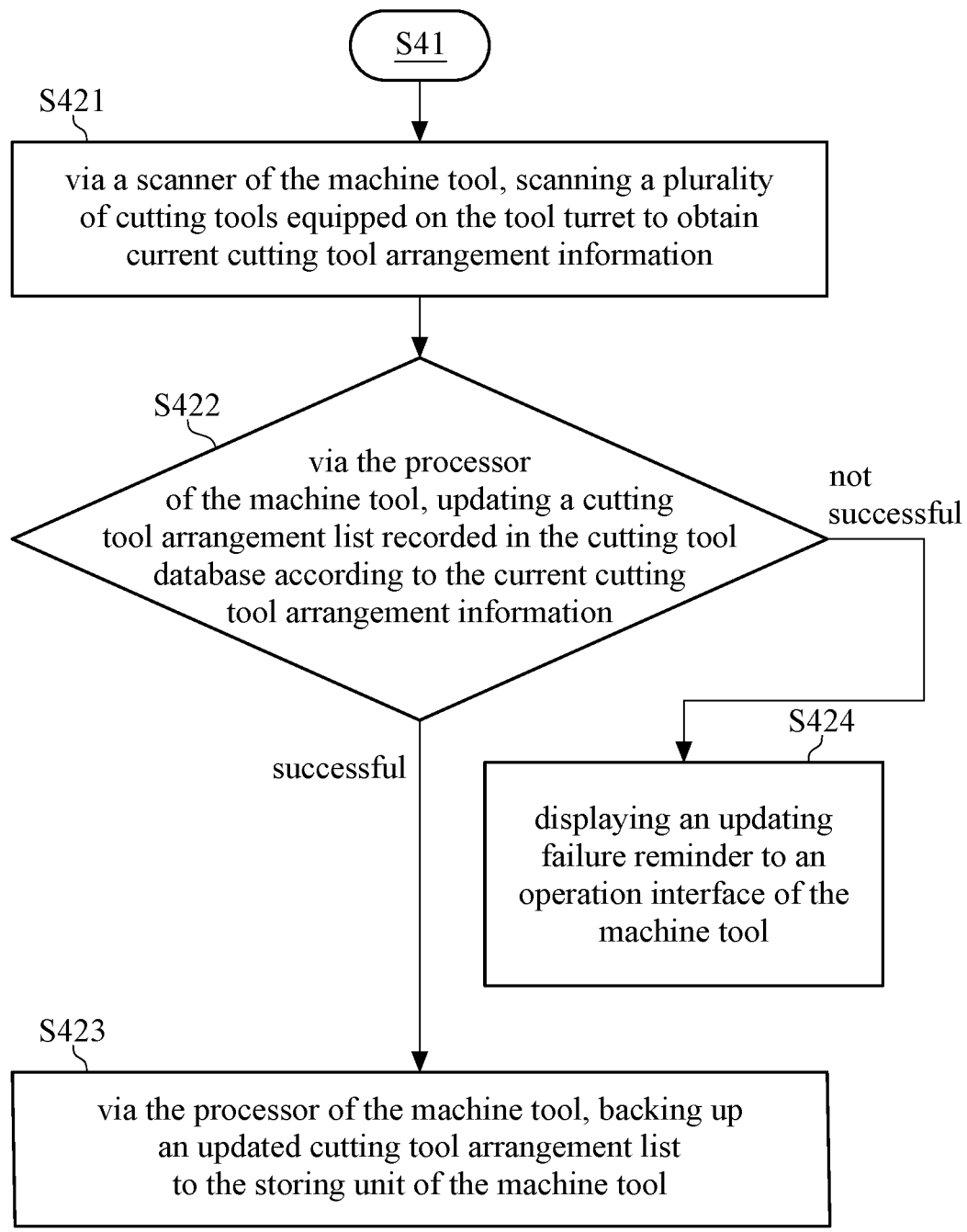
FIG. 6 shows steps of a cutting tool updating process of FIG. 5.

FIG. 6 shows steps of a cutting tool updating process of FIG. 5. As shown in FIG. 6, a step S421 is, via a scanner of the machine tool, scanning a plurality of cutting tools equipped on the tool turret to obtain current cutting tool arrangement information. A step S422 is, via the processor of the machine tool, updating a cutting tool arrangement list recorded in the cutting tool database according to the current cutting tool arrangement information. When the processor of the machine tool successfully updates the cutting tool arrangement list, then a step S423 is performed. When the processor of the machine tool fails to update the cutting tool arrangement list, then a step S424 is performed. The step S423 is, via the processor of the machine tool, backing up an updated cutting tool arrangement list to the storing unit of the machine tool. The step S424 is displaying an updating failure reminder to an operation interface of the machine tool, thereby reminding the operator of the machine tool.

For example, the tool turret is already equipped with seven cutting tools and the seven cutting tools have first to seventh electronic tags respectively. After the scanner of the machine tool scans all of the seven cutting tools, it may obtain current cutting tool arrangement information comprising the first to the seventh electronic tags. Then the processor of the machine tool synchronously updates a cutting tool arrangement list recorded in the cutting tool database according to the current cutting tool arrangement information, so that an updated cutting tool arrangement list is consistent with the current cutting tool arrangement information.

Figure 7:
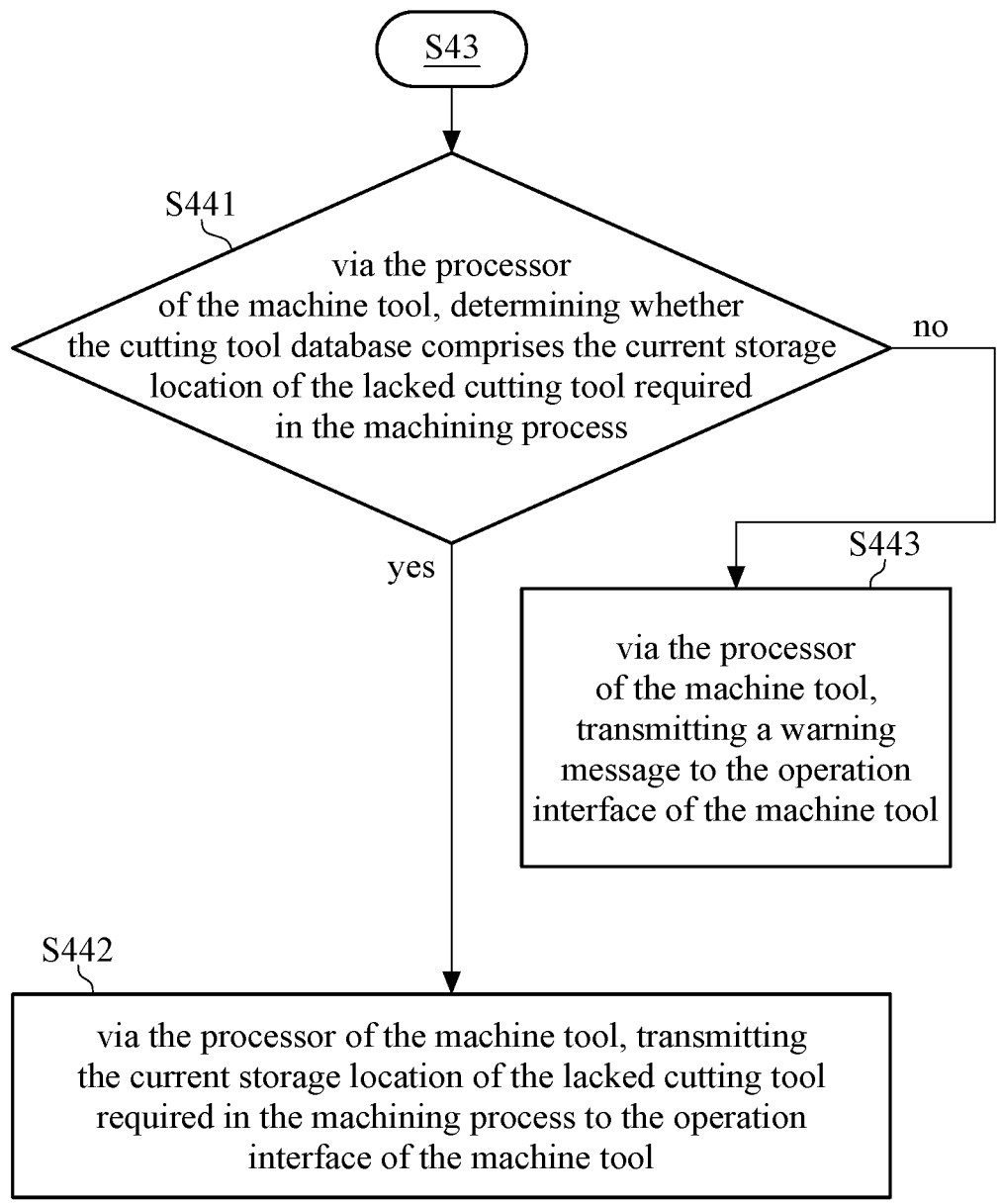
FIG. 7 shows steps of a cutting tool searching process of FIG. 5.

FIG. 7 shows steps of a cutting tool searching process of FIG. 5. As shown in FIG. 7, a step S441 is, via the processor of the machine tool, determining whether the cutting tool database comprises the current storage location of the lacked cutting tool required in the machining process. When the processor of the machine tool determines that the cutting tool database comprise the current storage location of the lacked cutting tool required in the machining process, then a step S442 is performed. When the processor of the machine tool determine that the cutting tool database does not comprise the current storage location of the lacked cutting tool required in the machining process, then a step S433 is performed.

The step S442 is, via the processor of the machine tool, transmitting the current storage location of the lacked cutting tool required in the machining process to the operation interface of the machine tool and displaying the current storage location of the lacked cutting tool required in the machining process at the operation interface of the machine tool. For example, when one of the tool turrets is equipped with the lacked cutting tool or the lacked cutting tool is located at a cutting tool warehouse, the operator of the machine tool can instantly go to the current storage location to get the lacked cutting tool required in the machining process.

The step S443 is, via the processor of the machine tool, transmitting a warning message to the operation interface of the machine tool, and displaying the warning message at the operation interface of the machine tool. Via the warning message, the operator of the machine tool may know that any one of the tool turrets is not equipped with the lacked cutting tool required in the machining process or the lacked cutting tool required in the machining process is not located at the cutting tool warehouses. Therefore, the lacked cutting tool required in the machining process may be lost, or the lacked cutting tool required in the machining process possibly is eliminated because it has reached the end of its service life.

Figure 8:
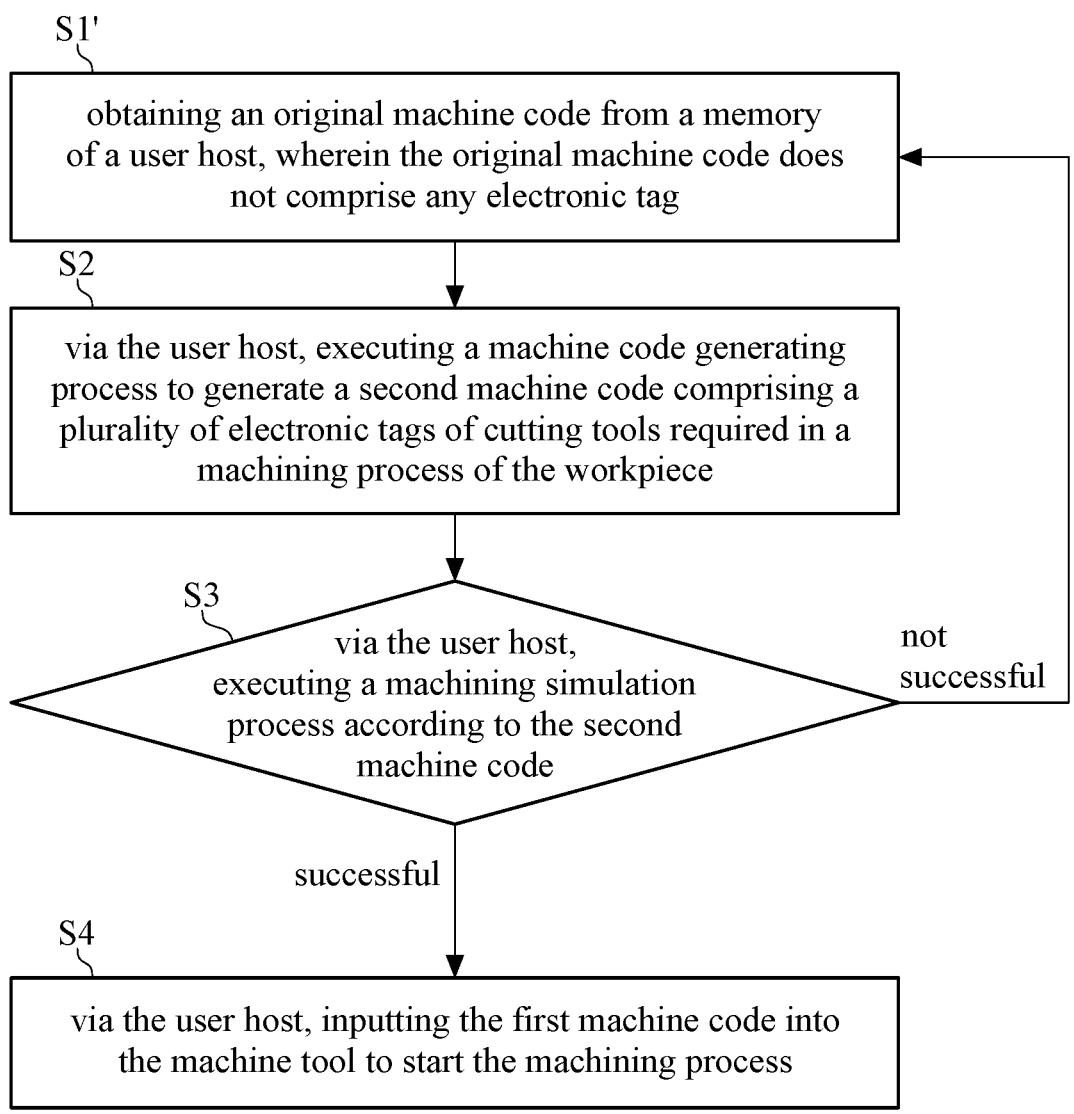
FIG. 8 is a flowchart of a management method for a cutting tool of a machine tool according to a second embodiment of the present disclosure.

FIG. 8 is a flowchart of a management method for a cutting tool of a machine tool according to a second embodiment of the present disclosure. As shown in FIG. 8, a step S1' is obtaining an original machine code from a memory of a user host, wherein the original machine code does not comprise any electronic tag. In this embodiment, the original machine code comprises locations of required cutting tools on a tool turret. The step S2 is, via the user host, executing the machine code generating process to generate a second machine code comprising a plurality of electronic tags, thereby replacing the locations of the required cutting tools (T codes) with the plurality of electronic tags. The step S3 is, via the user host, executing the machining simulation process according to the second machine code comprising the plurality of electronic tags. When the result of the step S3 is successful, then the step S4 is performed. When the result of the step S3 is not successful, then the step S1' is performed again to check whether the original machine code is wrong or the step S2 is performed again to check whether the second machine code is wrong. The step S4 is, via the user host, inputting the second machine code into the machine tool to start the machining process. Therefore, the main difference between the second embodiment of the management method and the first embodiment of the management method is that the second embodiment of the management method is to convert an existing machine code into a machine code comprises a plurality of electronic tags.

In view of the above description, through the electronic tags (such as radio frequency identifications) and local area network, the machine tools, the cutting tool database and the user host can be integrated to extend a range of a cutting tool management to an entire factory. In addition, when the machining simulation process is executed before the process starts, an interference between the cutting tools and the components or an over-travel of any one of the cutting tools may be predicted in advance, thereby avoiding accidents caused by human factors. Because the size information and the current storage locations may be obtained from the cutting tool database according to the electronic tags, an operator can quickly find the cutting tools used in the machining process even if the cutting tools used in the machining process even are frequently loaded and unloaded between the cutting tool warehouse and the machine tool, thereby reducing the number of workers required to find the cutting tools, and the time required to find the lacked cutting tools required in the machining process.

What is claimed is:

1. A management method for a cutting tool of a machine tool, comprising:
   obtaining an original machine code from a memory of a user host, wherein the original machine code does not comprise an electronic tag of a cutting tool required in a machining process;
   via the user host, executing a machine code generating process to generate a machine code, wherein the machine code comprises the electronic tag of the cutting tool required in the machining process;
   via a processor of the machine tool, reading the machine code to determine whether a storing unit of the machine tool stores the electronic tag of the cutting tool required in the machining process;
   via the processor of the machine tool, outputting a ready message to an operation interface of the machine tool when the processor of the machine tool determines that the storing unit of the machine tool stores the electronic tag of the cutting tool required in the machining process; and
   via the processor of the machine tool, executing a cutting tool searching process to output a current storage location of the cutting tool required in the machining process or a warning message to an operation interface of the machine tool when the processor of the machine tool determines that the storing unit of the machine tool does not store the electronic tag of the cutting tool required in the machining process.

2. The management method in claim 1, further comprising: executing a machining simulation process via the user host after the user host executes the machine code generating process and before the processor of the machine tool determines whether the storing unit of the machine tool stores the electronic tag of the cutting tool required in the machining process.

3. The management method in claim 1, wherein the machine code generating process comprises: via the user host, replacing a location of the required cutting tool with the electronic tag of the cutting tool required in the machining process.

* * * * *